United States Patent
Gordon et al.

(10) Patent No.: US 9,532,176 B1
(45) Date of Patent: Dec. 27, 2016

(54) SMOOTHED ACTIVITY SIGNALS FOR SUGGESTION RANKING

(71) Applicant: GOOGLE INC., Mountain View, CA (US)

(72) Inventors: David R. Gordon, Shibuya-ku (JP); Takahiro Kosakai, Tokyo (JP); Yuta Sawa, Tokyo (JP)

(73) Assignee: GOOGLE INC., Mountain View, CA (US)

( * ) Notice: Subject to any disclaimer, the term of this patent is extended or adjusted under 35 U.S.C. 154(b) by 163 days.

(21) Appl. No.: 14/090,500

(22) Filed: Nov. 26, 2013

(51) Int. Cl.
*H04W 24/00* (2009.01)
*H04W 4/02* (2009.01)

(52) U.S. Cl.
CPC .................................. *H04W 4/025* (2013.01)

(58) Field of Classification Search
None
See application file for complete search history.

(56) References Cited

U.S. PATENT DOCUMENTS

| | | | | |
|---|---|---|---|---|
| 2005/0136949 | A1* | 6/2005 | Barnes, Jr. | G06Q 10/1053 455/461 |
| 2011/0177845 | A1* | 7/2011 | Fasold | G09B 29/007 455/566 |
| 2011/0276565 | A1* | 11/2011 | Zheng | G01C 21/20 707/724 |
| 2012/0084248 | A1* | 4/2012 | Gavrilescu | G06F 17/30867 706/52 |
| 2012/0100867 | A1 | 4/2012 | Liang et al. | |
| 2012/0100869 | A1 | 4/2012 | Liang et al. | |
| 2013/0190004 | A1* | 7/2013 | Papakipos | H04W 64/00 455/456.1 |
| 2013/0325404 | A1* | 12/2013 | Yuen | G06F 11/00 702/182 |
| 2015/0072712 | A1* | 3/2015 | Huang | H04W 4/028 455/456.3 |
| 2015/0208203 | A1* | 7/2015 | Cao | G06F 17/3087 455/456.3 |

* cited by examiner

*Primary Examiner* — Suhail Khan
(74) *Attorney, Agent, or Firm* — Marshall, Gerstein & Borun LLP

(57) ABSTRACT

Relevant geospatial data is provided to a portable device. In particular, several activity detection results collected over a period of time, spanning several time intervals, are received, where each activity detection result provides an estimate of the portable device activity, and where the activity detection results indicate at least two different activities. A single predominant activity of the portable device is determined using the activity detection results. Based on the predominant activity, geospatial data is selected and then provided to the portable device.

17 Claims, 4 Drawing Sheets

SMOOTHED ACTIVITY SIGNALS FOR SUGGESTION RANKING

FIELD OF THE DISCLOSURE

The present disclosure relates to digital maps and, more particularly, to providing automatic suggestions or categorical search results to a user on a portable device based on an activity of the portable device.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, many portable devices support software applications that display interactive digital maps. Some of these software applications are developed primarily for providing interactive digital maps. Other software applications, such as web browsers, may display interactive digital maps along with other content. In either case, these applications generally provide multiple functions for interacting with the digital map, such as changing the zoom level, repositioning the viewport, etc. Moreover, these applications often provide additional information related to the map, such as a listing of businesses located in the area visible in the viewport.

Furthermore, some portable devices are equipped with sensors that can detect various characteristics of the device, such as the speed at which the portable device is moving, the orientation of the portable device, the direction in which the portable device is headed, etc. For example, a portable device can use sensor data to ascertain, with a certain level of confidence, whether the user of the portable device is walking at this instant.

SUMMARY

Figure 1:
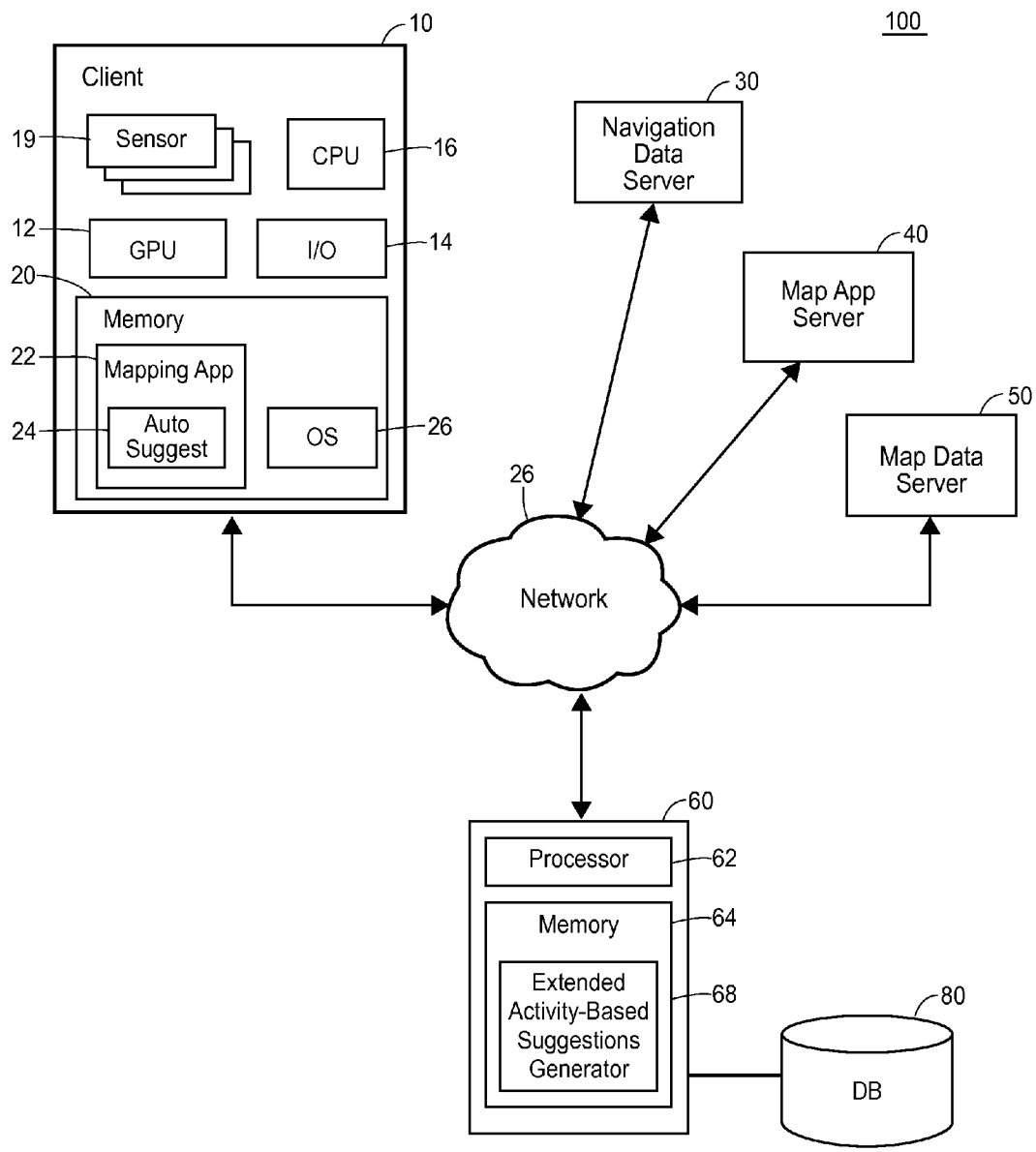
FIG. 1 is a block diagram of an example system in which techniques for providing activity-based suggestions to a client device can be implemented.

To provide better suggestions or search results to the user of a portable device, a software system that implements an online mapping service determines the predominant activity of the device during a certain period of time. The determined predominant activity can be driving, for example, even though the period of time includes intervals during which the device is carried at a walking speed or resting in one place. In an example implementation, the software system receives data points collected at the portable device over a period of time, where each data point indicates estimated activity of the portable device during a different interval within the period of time. As a more particular example, 20 data points can correspond to twenty respective contiguous 15-second intervals that together make up a five-minute time period. Each data point also can include a metric of confidence in determining an activity of the device during the corresponding time interval. Thus, one data point can indicate that during a certain 15-second interval, the device was being carried by a pedestrian with 85% certainty, and another data point can indicate that during the next 15-second interval, the device was being carried by a driver, with 95% certainty. The software system analyzes the received data to determine which activity was the predominant activity during the time period. In various implementations and scenarios, the software system uses the determined predominant device activity to provide relevant suggestions or search results to the portable device.

In particular, an example embodiment of the techniques of the present disclosure is a method in a computing device for providing relevant geospatial data to a portable device. The method includes receiving, by one or more processors, a plurality of activity detection results collected over a period of time, wherein the period of time spans a plurality of intervals, wherein each of the activity detection results provides an estimate of an activity of the portable device during a respective one of the plurality of intervals, and wherein at least two of the plurality of activity detection results indicate different activities. The method also includes determining, by the one or more processors, a single predominant activity of the portable device during the period of time, using the plurality of activity detection results; causing, by the one or more processors, geospatial data to be selected in accordance with the predominant activity of the portable device; and causing, by the one or more processors, the geospatial data to be provided to the portable device.

Another example embodiment of the techniques of the present disclosure is a portable device configured to operate in a communication network. The portable device includes one or more sensors configured to determine characteristics of motion and orientation of the portable device, one or more processors, and a non-transitory computer-readable medium storing thereon instructions which, when executed by the one or more processors, cause the portable device to: determine, at multiple instances within a time period of a certain length, current mode of transport of the portable device to generate detection results, such that at least two of the detection results indicate different modes of transport. The instructions further cause the portable device to assign respective confidence scores to the detection results, determine a single predominant mode of transport based on the detection results and the confidence scores, and receive geospatial data selected according to the predominant mode of transport.

Still another example embodiment of the techniques of the present disclosure is a portable device configured to operate in a communication network. The portable device includes one or more sensors configured to determine characteristics of motion and orientation of the portable device; one or more processors; and a non-transitory computer-readable medium storing thereon instructions configured to execute on the one or more processors to: (i) obtain, using the one or more sensors, indications of motion of the portable device a plurality of times within a time period longer than a minute to generate a plurality of motion detection results, (ii) determine respective confidence scores for the plurality of motion detection results, (iii) provide the motion detection results and the confidence scores to a network service via the communication network to determine a predominant type of motion of the portable device during the time period, and (iv) receive, via the communication network, content selected according to the predominant type of motion of the portable device during the time period.

Yet another example embodiment is a portable device configured to operate in a communication network. The portable device includes a user interface, one or more processors, and a non-transitory computer-readable medium storing a instructions. When executed by the one or more processors, the instructions cause the portable device to determine a single predominant mode of transport of the portable device during a time period of a certain length, where the time period includes a first time when the characteristics of motion and orientation of the portable device are consistent with a first mode of transport, and a second time when the characteristics of motion and orientation of the portable device are consistent with a second mode of transport. The instructions also cause the portable device to provide, via the user interface, geospatial data selected according to the single predominant mode of transport.

DETAILED DESCRIPTION

In embodiments described below, a software application on a portable device provides relevant information to the user based on the activity in which the portable device is predominantly engaged during a period of time, also referred to in this disclosure as "the predominant activity." As discussed in more detail with reference to FIGS. 1-4, a software system implemented in the portable device and/or one or more network servers determines the predominant activity of the portable device based on the detected activities of the portable device at several contiguous time intervals that make up a relatively long period of time (e.g., one minute, five minutes, ten minutes).

One example of an activity that can be detected using these techniques is the mode of transport of the portable device. In one implementation, the modes of transport include walking, driving, bicycling, riding in a public transit vehicle, remaining stationary, etc. More generally, however, the techniques of this disclosure can be applied to any type of an activity. For convenience, the examples below illustrate the techniques of this disclosure specifically in application to modes of transport.

Once the software system determines the predominant activity of the portable device, one or more network servers (referred to collectively as "the autosuggest server") can automatically generate suggestions in view of the predominant activity. For example, when the predominant activity is walking, a suggestion can include a point of interest (POI) accessible primarily to pedestrians, such as a food stand in the middle of a park. As another example, the response to a geospatial query can be tailored to the predominant activity.

FIG. 1 illustrates an example communication system 100 in which these techniques can be implemented. The communication system 100 includes portable client devices such as a client device 10 configured to execute a mapping application 22. In addition to the client device 10, the communication system 100 includes a server 60 configured to automatically provide suggestions to the client device 10 (autosuggest server). The autosuggest server 60 can be communicatively coupled to a database 80 that stores, in an example implementation, POI information including location of businesses, hours of operation, user reviews, etc. More generally, the autosuggest server 60 can cooperate with one or several databases that store any type of suitable information. The communication system 100 also can include a navigation data server 30 that provides driving, walking, or public transit directions, for example. Further, the communication system 100 can include a map application server 40 that provides instructions that implement the mapping application 22 to client devices. Still further, the communication system 100 can include a map data server 50 that provides map data to instances of the mapping application 22 for generating interactive digital maps on the corresponding client devices. The devices operating in the communication system 100 can be interconnected via a communication network 26.

In an example implementation, the client device 10 is a portable device that includes a memory 20, one or more processors (CPUs) 16, a graphics processing unit (GPU) 12, an I/O module 14 and one or several sensors 19. The memory 20 can be a non-transitory memory and can include on or several suitable memory modules, such as random access memory (RAM), read-only memory (ROM), flash memory, other types of persistent memory, etc. The I/O module 14 may be a touch screen, for example. More generally, the techniques of this disclosure can be implemented in other types of devices, such as laptop or desktop computers, etc.

Depending on the implementation, the one or more sensors 19 can include a global positioning system (GPS) module to detect the position of the device, a compass to determine the direction of the client device 10, a gyroscope to determine the rotation and tilt, a thermometer to determine temperature, a light sensor, a barometer to detect air pressure, etc.

The memory 20 stores an operating system (OS) 26, which can be any type of suitable mobile or general-purpose operating system. The OS 26 can include application programming interface (API) functions that allow applications (such as the mapping application 22) to retrieve sensor readings. For example, a software application configured to execute on the client device 10 can include instructions that invoke an OS 26 API for retrieving an estimated mode of transport of the client device 10 at that instant. The API can also return a quantitative indication of how certain the API is of the estimate (e.g., as a percentage).

The memory 20 also stores the mapping application 22, which is configured to generate interactive digital maps. The mapping application 22 can receive map data in a raster (e.g., bitmap) or non-raster (e.g., vector graphics) format from the map data server 50. In some cases, the map data can be organized into layers, such as a basic layer depicting roads, streets, natural formations, etc., a traffic layer depicting current traffic conditions, a weather layer depicting current weather conditions, etc. The mapping application 22 also can receive geographic search queries and provide search results on the digital map or in conjunction with the digital map, automatically provide suggestions (e.g., highlight POIs in which the user may be interested), display driving, walking, or transit directions, and in general provide functions related to geography, geolocation, navigation, etc.

It is noted that although FIG. 1 illustrates the mapping application 22 as a standalone application, the functionality of the mapping application 22 also can be provided in the form of an online service accessible via a web browser executing on the client device 10, as a plug-in or extension for another software application executing on the client device 10, etc.

In some implementations, the autosuggest server 60 includes one or more processors 62 and a memory 64. The memory 64 may be tangible, non-transitory memory and may include any types of suitable memory modules, including random access memory (RAM), read-only memory (ROM), flash memory, other types of persistent memory, etc. The memory 64 stores instructions executable on the processors 62 that make up an extended activity-based suggestion generator 68, which can automatically generate suggestions for the mapping application 22 based on data from the sensors 19. The memory 64, or the memory in another server, similarly can store instructions that implement geospatial search result generator that provides search results according to an extended set of data, from which the predominant activity of the client device 10 is derived.

For simplicity, FIG. 1 illustrates the autosuggest server 60 as only one instance of a server. However, the autosuggest server 60 according to some implementations includes a group of one or more autosuggest servers, each equipped with one or more processors and capable of operating independently of the other autosuggest servers. Autosuggest servers operating in such a group can process requests from the client device 10 individually (e.g., based on availability), in a distributed manner where one operation associated with processing a request is performed on one autosuggest server while another operation associated with processing the same request is performed on another autosuggest server, or according to any other suitable technique. For the purposes of this discussion, the term "autosuggest server" may refer to an individual autosuggest server or to a group of two or more autosuggest servers.

In operation, the mapping application 22 operating in the client device 10 sends data from the sensors 19 to the autosuggest server 60. Thus, in one example, the autosuggest server 60 can receive N indications of activity (along with the corresponding indications of confidence) for N contiguous intervals in a certain period time, with some of these indications identifying different activities. Examples of such data are further discussed with reference to FIG. 2. In response, the autosuggest server 60 determines the predominant mode of transport of the client device 10 and generates suggestions corresponding to the determined predominant mode of transport. The autosuggest server 60 then sends the suggestions back to the client device 10.

The autosuggest server 60 can determine the predominant activity of the portable device 10 using several configurable parameters, in one implementation. For example, one parameter can specify the duration of the period of time for reliably detecting the predominant activity. Another parameter can define the number of time intervals into which the period of time is divided, where the client device 10 reports a respective indication of device activity for each interval. Further, a set of parameters can define weights that are applied to the individual indications of device activity when determining the predominant activity.

In another implementation, an autosuggest module 24 can be implemented in the mapping application 22 to determine the predominant activity of the client device 10. It is noted that the autosuggest module 24 or a similar module can determine the predominant activity for any suitable purpose, including generating automatic suggestions, adjusting search results, adjusting driving directions, etc. In yet another implementation, the autosuggest module 24 can co-operate with the activity-based suggestion generator 68.

As a more specific example, a software module operating in the client device 10 can determine the predominant mode of transport or other activity for a certain period of time and, when the mapping application 22 receives geospatial data from the server 60, the mapping application 22 can select a subset of this geospatial data that best corresponds to the determined predominant mode of transport. To this end, the software module processes multiple indications of activity and the corresponding indications of confidence. According to one such embodiment, the server 60 may provide geospatial data that is not selected in view of the mode of transport of the client device 10 (in other words, the server 60 may not use the mode of transport of the client device 10 as one of the signals in selecting geospatial data). In another embodiment, the server 60 uses the mode of transport as one of the signals but receives different indications of the mode of transport of the client device during the relevant period of time. In either case, the server 60 can provide geospatial data for multiple modes of transport, and the mapping application 22 can choose what portions of this data to provide to the user depending on the predominant mode of transport determined at the client device 10.

Figure 2:
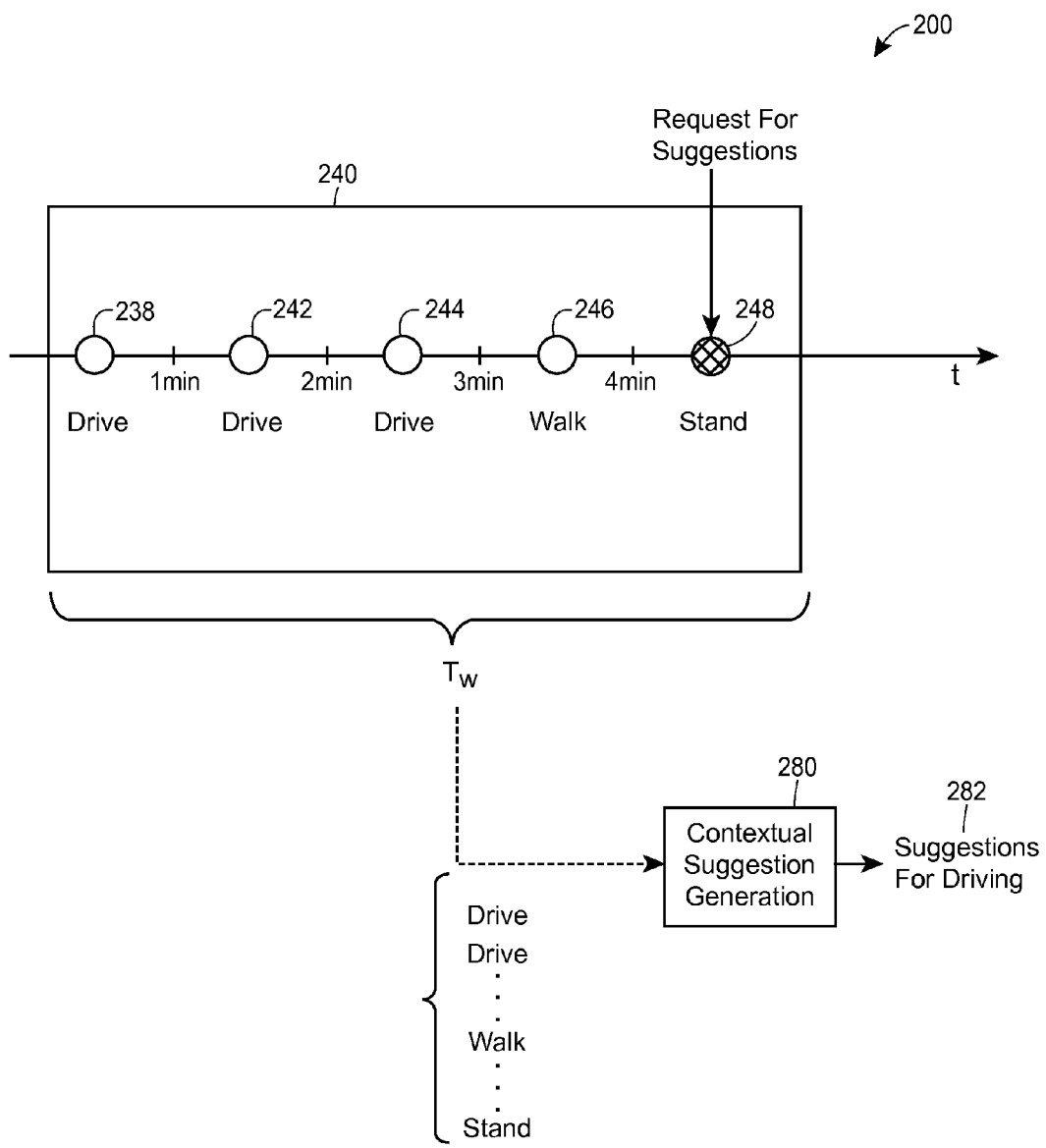
FIG. 2 schematically illustrates a time window of sensor data samples, which an autosuggest server can analyze to generate activity-based suggestions.

For further clarity, FIG. 2 schematically illustrates the technique for determining the predominant activity of a portable device. More specifically, FIG. 2 illustrates an example application of these techniques to determining the predominant mode of transport for the purpose of automatically generating suggestions.

With reference to the communication system depicted in FIG. 1, the extended-activity based suggestion generator 68 receives data from the sensors 19 of the client device 10 corresponding to modes of transport at several time intervals over a selected window of time 240. In one embodiment, the extended-activity based suggestion generator 68 selects the time at which suggestions are requested 248 as the leading edge for the time window 240. The extended-activity based suggestion generator 68 also selects a period of time to receive data from the sensors 19. The trailing edge for the time window can be found by subtracting the selected period of time from the time at which suggestions are requested 248. In one embodiment, the parameters of the time window 240 may be stored in a computer-readable medium at the autosuggest server 60 or the client device 10.

The extended-activity based suggestion generator 68 then receives data from the sensors 19 within the boundaries of the time window 240, also referred to as activity detection results. In one embodiment, the selected period of time is four minutes, but it can be longer or shorter in other embodiments. In the illustrated scenario, at time t=4.5 minutes the extended activity-based suggestion generator 68 receives discrete time samples from the sensors 19 of the client device 10 which detect driving 238 at t=0.5 minutes, driving 242 at t=1.5 minutes, driving 244 at t=2.5 minutes, walking 246 at t=3.5 minutes and standing 248 at t=4.5 minutes. In one implementation the sensor data includes discrete time samples. In other implementations the sensor data can be continuous. The data from the sensors 19 as well as the selected time window 240 is stored in a computer-readable medium such as the autosuggest server 60 or the client device 10.

The extended activity-based suggestion generator 68 then analyzes the activity detection results collected in the time window 240 to determine the predominant mode of transport of the client device 10. The extended activity-based suggestion generator 68 then provides an indication of the predominant activity to the contextual suggestion generation module 280, which can be a software component that can be implemented in the same server as the activity-based suggestion generator 68, in a different one or more servers, or in any other suitable one or several device. In one implementation, the extended activity-based suggestion generator 68 executes a weight-based selection algorithm to analyze the activity detection results.

The extended activity-based suggestion generator 68 can analyze the activity detection results using several methods to determine the predominant mode of transport. Each individual method can be combined with other methods in any order to determine the predominant mode of transport. As one example, the extended activity-based suggestion generator 68 can apply a thresholding function to the time window 240 to eliminate noise in the activity detection results. For example, a thresholding function can be applied to eliminate, or "filter out," outliers. If, for example, the sensors 19 detected walking and driving 20 times and bicycling two times within the time window, the thresholding function would eliminate bicycling from consideration as the predominant mode of transport of the client device 10.

Moreover, each mode of transport can be assigned a ranking in order of occurrences within the time window 240. Certain samples can also be prioritized based on when the corresponding activity occurred. For example, the more recent samples may be more relevant to the predominant mode of transport than older samples. Also, samples can be weighted according to the current activity. For example, driving may be weighted more heavily than walking since it is likely that walking for a few minutes after a long drive is just a short break or stop at a gas station.

The extended activity-based suggestion generator 68 can also receive confidence values for each mode of transport at every time interval and determine the predominant activity based on the average confidence scores. For example, at each time interval the sensors 19 may not determine with complete certainty the mode of transport of the client device 10. Instead, the sensors 19 may determine at a particular time interval that there is a 60% chance the mode of transport is walking and a 40% chance the mode of transport is bicycling. The extended activity-based suggestion generator 68 may receive confidence scores for each mode of transport at each time interval. In this example, the extended activity-based suggestion generator 68 may receive a score of "6" for walking and a score of "4" for bicycling. The extended activity-based suggestion generator 68 can average the confidence scores for each mode of transport over the time window 240 and determine the predominant activity based on the average confidence scores.

Additional sensor information may also be used to determine the predominant activity. For example, if driving and walking are both samples within the time window 240, but the GPS of the client device 10, indicates the device is in the middle of a hiking trail or campsite it becomes unlikely the predominant mode of transport is driving. In some embodiments, the client device 10 uses the GPS data to determine the predominant activity only if the user selects a certain setting. Some or all of these techniques may be used individually or in combination in any order to analyze activity detection results.

In some implementations, once the extended activity-based suggestion generator 68 determines the predominant activity of the client device 10, suggestions containing mapping information are generated based on the predominant mode of transport, such as suggestions for driving 282. For example, if the predominant mode of transport is driving, the extended activity-based suggestion generator 68 may suggest nearby gas stations or fast food restaurants right off the highway. The extended activity-based suggestion generator 68 may also suggest a POI within driving distance but too far for walking. On the other hand, if the predominant mode of transport is walking, the extended activity-based suggestion generator 68 may suggest POIs within the building the device is currently located if the user chooses a setting allowing the client device 10 to use GPS data. If the predominant mode of transport is biking, the extended activity-based suggestion generator 68 may suggest POIs located right next to a bike trail, which would be too inconvenient for a driver to get to and too far for a walker.

Figure 3:
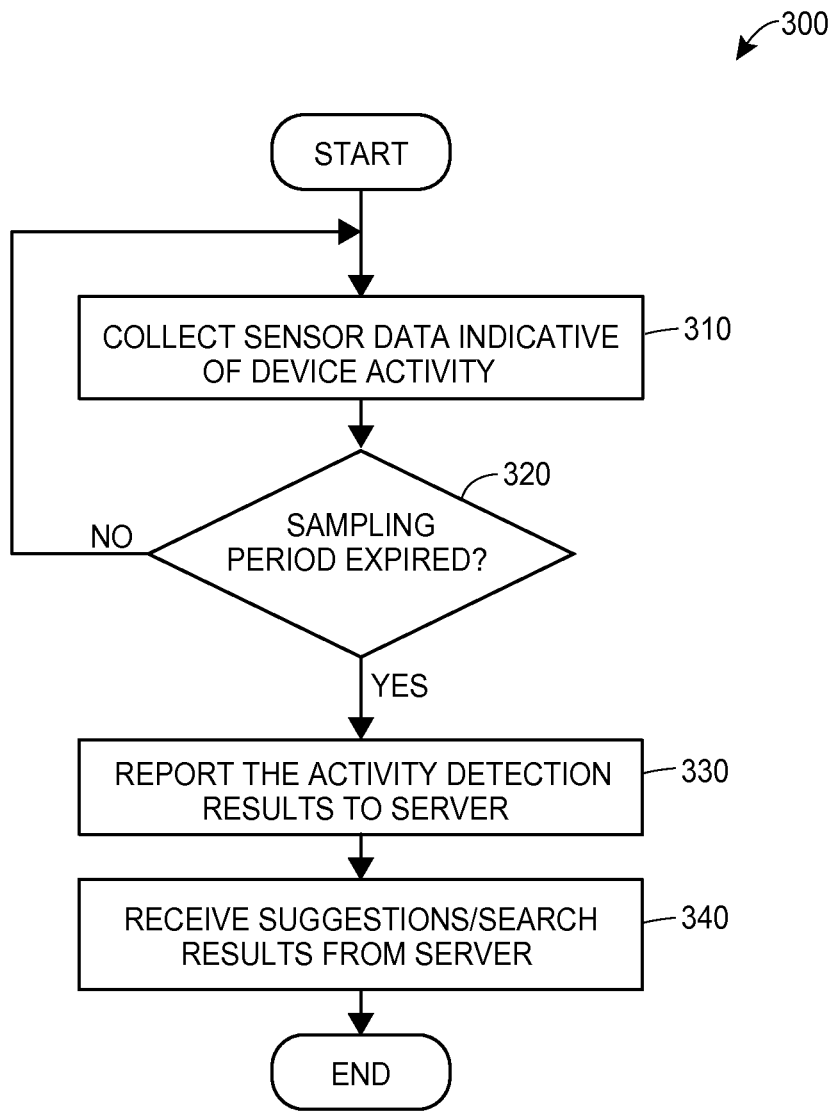
FIG. 3 is a flow diagram of an example method for receiving activity-based suggestions at the client device.

FIG. 3 is a flow diagram of an example method 300 which the mapping application 22 can implement, for example. More generally, the method 300 can be implemented in any suitable device or a group of devices.

At step 310, sensor data indicative of the device activity during a certain interval is collected. To this end, an API provided by the OS of the client device can be used. Then, at step 320, the method 300 determines whether the sampling period has expired. The sampling period can be set at, for example, one minute, five minutes, ten minutes, etc. If the sampling period has not expired, the flow reverts back to step 320 to collect more sensor data. On the other hand, if the sampling period has expired, the activity detection results are reported to the autosuggest server at step 330. At step 340, suggestions based on predominant activity of the device are received from the autosuggest server 60.

In this scenario, a client device collects and interprets sensor data for a given interval within a certain time period. In other implementations, however, the client device can provide "raw" sensor data to a network device (e.g., autosuggest server 60), where multiple interval-specific samples are analyzed to determine the predominant activity.

Figure 4:
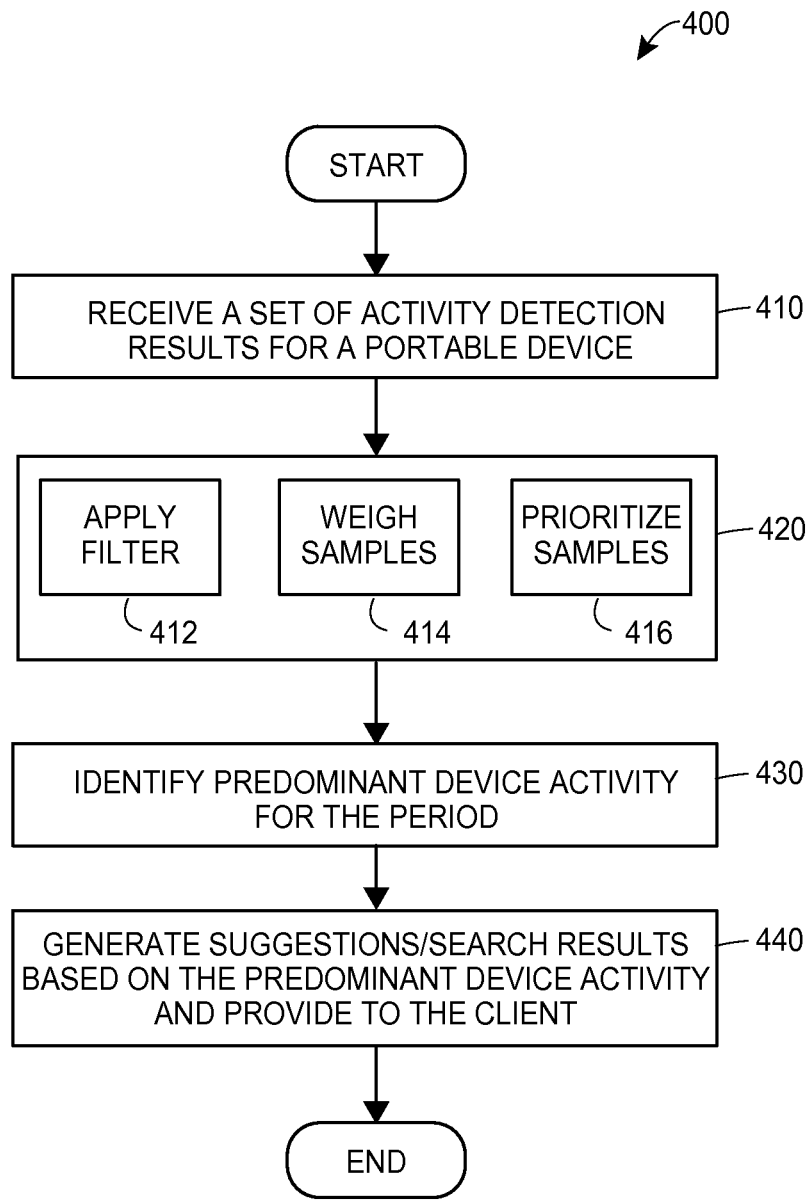
FIG. 4 is a flow diagram of an example method for generating activity-based suggestions at the autosuggest server.

FIG. 4 is a flow diagram of an example method that can be implemented in the autosuggest server 60, for example. At step 410, a set of activity detection results, or samples, are received. Then, at step 420, the activity detection results are analyzed to determine the predominant device activity.

The activity detection results can be analyzed using one or several techniques to determine the predominant device activity. For example, a thresholding function can be applied to eliminate the outliers (412), the samples can be weighed (414), and the samples can be prioritized (416). Some or all of these techniques may be used individually or in combination, in any order, to analyze the activity detection results.

At step 430, the predominant activity is identified based on the analyzed activity detection results for the selected period of time. At step 440, suggestions and/or search results that are based (at least in part) on the predominant device activity can be generated and provided to the client device 10. In another implementation, the predominant device activity can be analyzed and determined at the client device 10 via the autosuggest generator 24. In yet another implementation, the predominant device activity can be analyzed and determined in an exchange between the autosuggest server 60 and the client device 10.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for providing data to a client according to a predominant device activity through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for providing relevant geospatial data to a portable device, the method comprising:
receiving, by one or more processors, a plurality of activity detection results collected over a period of time, wherein the period of time spans a plurality of intervals, wherein each of the activity detection results provides an estimate of a mode of transport of the portable device during a respective one of the plurality of intervals, and wherein at least two of the plurality of activity detection results indicate different modes of transport;
determining, by the one or more processors, a single predominant mode of transport of the portable device during the period of time, using the plurality of activity detection results, including:
for each mode of transport, determining a number of activity detection results within the period of time that correspond to the mode of transport and assigning a respective weight to each of the activity detection results based on the corresponding mode of transport; and
determining the single predominant mode of transport according to the number of activity detection results and the weights assigned to the activity detection results for each mode of transport;
causing, by the one or more processors, geospatial data to be selected based on the predominant mode of transport of the portable device, the geospatial data including points of interest (POIs) selected based on accessibility to the POIs based on the predominant mode of transport, wherein a first set of POIs are selected when the predominant mode of transport is a first predominant mode of transport and a second set of POIs are selected when the predominant mode of transport is a second predominant mode of transport which is different from the first predominant mode of transport; and
causing, by the one or more processors, search suggestions including the geospatial data to be provided to the portable device.

2. The method of claim 1, wherein each of the plurality of activity detection results indicates a mode of transport selected from a set including (i) driving, (ii) riding in a public transit vehicle, (iii) bicycling, (iv) walking, and (v) being substantially stationary.

3. The method of claim 1, wherein assigning a respective weight to each of the activity detection results based on the corresponding mode of transport includes applying, by the one or more processors, a thresholding function to eliminate outliers in the plurality of activity detection results.

4. The method of claim 1, wherein the plurality of activity detection results are received from the portable device, the method further comprising:
receiving, by the one or more processors, respective weights assigned to the plurality of activity detection results by the portable device in view of levels of confidence associated with the plurality of activity detection results.

5. The method of claim 1, wherein determining the single predominant mode of transport using the plurality of activity detection results includes:
determining, by the one or more processors, aggregate scores for each mode of transport indicated by the plurality of activity detection results to generate a plurality of candidate modes of transport,
selecting as the predominant mode of transport, from among the plurality of candidate modes of transport, a mode of transport with an aggregate score that exceeds aggregates scores of the rest of the plurality of candidate modes of transport by a confidence threshold value.

6. The method of claim 1, wherein the period of time is between one and ten minutes long.

7. The method of claim 6, wherein each of the plurality of intervals is between one and 20 seconds long.

8. The method of claim 1, further comprising:
receiving, by the one or more processors, a geospatial query submitted via a user interface of portable device;
wherein causing the geospatial data to be selected includes:

obtaining candidate geospatial data responsive to the geospatial query, and selecting a subset of the candidate geospatial data that corresponds to the single predominant mode of transport, as the geospatial data.

9. The method of claim of claim 1, wherein the plurality of activity detection results are generated at the portable device, and wherein determining the single predominant mode of transport of the portable device during the period of time is implemented in a network server coupled to the portable device via a communication network.

10. A computing device comprising:

a communication interface;

one or more processors coupled to the communication interface;

a non-transitory computer-readable memory coupled to the one or more processors and storing thereon instructions that, when executed by the one or more processors, cause the computing device to:

receive, via the communication interface from a portable device, a plurality of activity detection results collected over a period of time, wherein the period of time spans a plurality of intervals, wherein each of the activity detection results provides an estimate of a mode of transport of the portable device during a respective one of the plurality of intervals, and wherein at least two of the plurality of activity detection results indicate different modes of transport;

determine a single predominant mode of transport of the portable device during the period of time, using the plurality of activity detection results, including:

for each mode of transport, determine a number of activity detection results within the period of time that correspond to the mode of transport and assign a respective weight to each of the activity detection results based on the corresponding mode of transport; and determine the single predominant mode of transport according to the number of activity detection results and the weights assigned to the activity detection results for each mode of transport;

cause geospatial data to be selected based on the predominant mode of transport of the portable device, the geospatial data including points of interest (POIs) selected based on accessibility to the POIs based on the predominant mode of transport, wherein a first set of POIs are selected when the predominant mode of transport is a first predominant mode of transport and a second set of POIs are selected when the predominant mode of transport is a second predominant mode of transport which is different from the first predominant mode of transport; and cause search suggestions including the geospatial data to be provided to the portable device.

11. The computing device of claim 10, wherein each of the plurality of activity detection results indicates a mode of transport selected from a set including (i) driving, (ii) riding in a public transit vehicle, (iii) bicycling, (iv) walking, and (v) being substantially stationary.

12. The computing device of claim 10, wherein to assign a respective weight to each of the activity detection results based on the corresponding mode of transport includes applying a thresholding function to eliminate outliers in the plurality of activity detection results.

13. The computing device of claim 10, wherein the instructions further cause the system to:

receive, via the communication network, respective weights assigned to the plurality of activity detection results by the portable device in view of levels of confidence associated with the plurality of activity detection results.

14. The computing device of claim 10, wherein to determine the single predominant mode of transport using the plurality of activity detection results, the instructions cause the system to:

determine aggregate scores for each mode of transport indicated by the plurality of activity detection results to generate a plurality of candidate modes of transport, select as the predominant mode of transport, from among the plurality of candidate modes of transport, a mode of transport with an aggregate score that exceeds aggregates scores of the rest of the plurality of candidate modes of transport by a confidence threshold value.

15. A non-transitory computer-readable medium storing instructions for providing relevant geospatial data to a portable device, when executed by one or more processors in a computing device, cause the one or more processors to:

receive, via a communication interface from a portable device, a plurality of activity detection results collected over a period of time, wherein the period of time spans a plurality of intervals, wherein each of the activity detection results provides an estimate of a mode of transport of the portable device during a respective one of the plurality of intervals, and wherein at least two of the plurality of activity detection results indicate different modes of transport;

determine a single predominant mode of transport of the portable device during the period of time, using the plurality of activity detection results, including:

for each mode of transport, determine a number of activity detection results within the period of time that correspond to the mode of transport and assign a respective weight to each of the activity detection results based on the corresponding mode of transport; and determine the single predominant mode of transport according to the number of activity detection results and the weights assigned to the activity detection results for each mode of transport;

cause geospatial data to be selected based on the predominant mode of transport of the portable device, the geospatial data including points of interest (POIs) selected based on accessibility to the POIs based on the predominant mode of transport, wherein a first set of POIs are selected when the predominant mode of transport is a first predominant mode of transport and a second set of POIs are selected when the predominant mode of transport is a second predominant mode of transport which is different from the first predominant mode of transport; and cause the geospatial data to be provided to the portable device.

16. The computer-readable medium of claim 15, wherein each of the plurality of activity detection results indicates a mode of transport selected from a set including (i) driving, (ii) riding in a public transit vehicle, (iii) bicycling, (iv) walking, and (v) being substantially stationary.

17. The computer-readable medium of claim 15, wherein to assign a respective weight to each of the activity detection results based on the corresponding mode of transport includes applying a thresholding function to eliminate outliers in the plurality of activity detection results.

* * * * *